March 13, 1934.　　　　E. L. OPPERMAN　　　　1,950,904
GUIDE MEANS FOR A RECEPTACLE IN PHOTOGRAPHIC APPARATUS
Filed Dec. 11, 1931　　　2 Sheets-Sheet 1
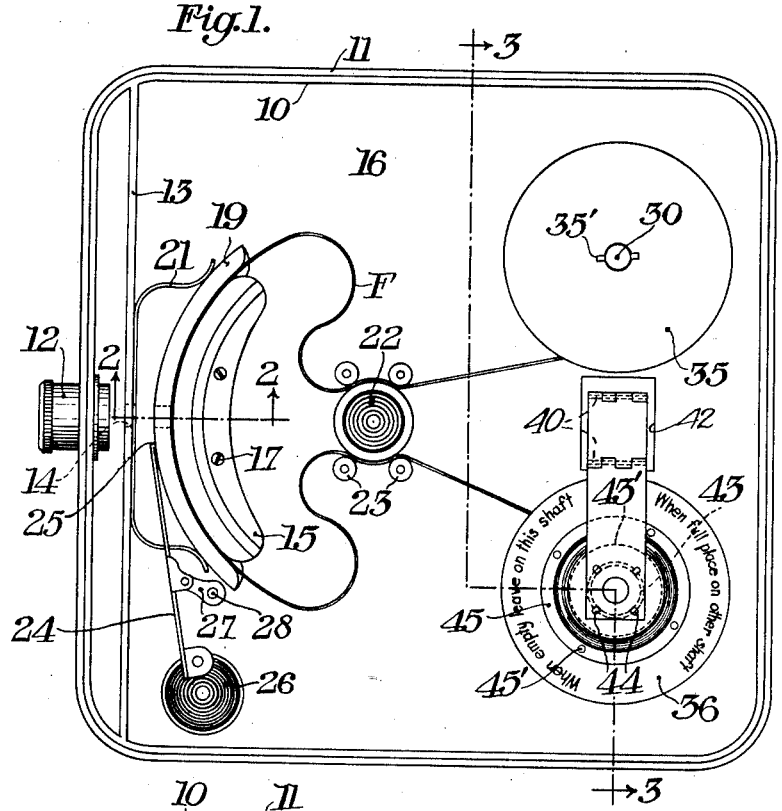
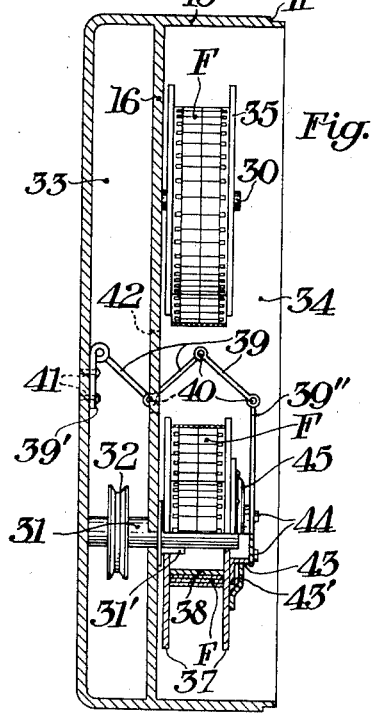
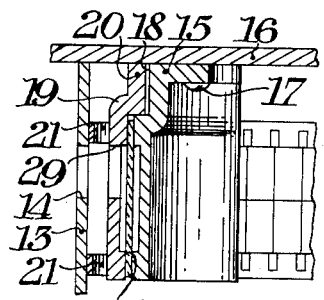
Emil L. Opperman,
Inventor March 13, 1934. E. L. OPPERMAN 1,950,904
GUIDE MEANS FOR A RECEPTACLE IN PHOTOGRAPHIC APPARATUS
Filed Dec. 11, 1931 2 Sheets-Sheet 2
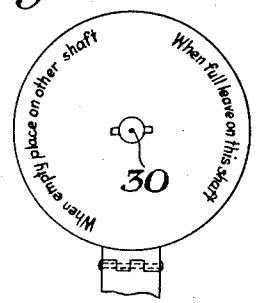
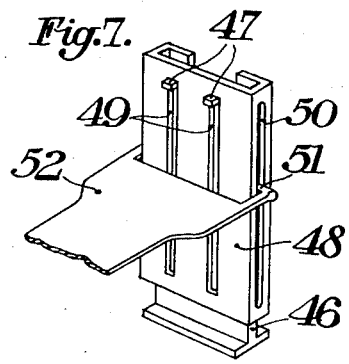
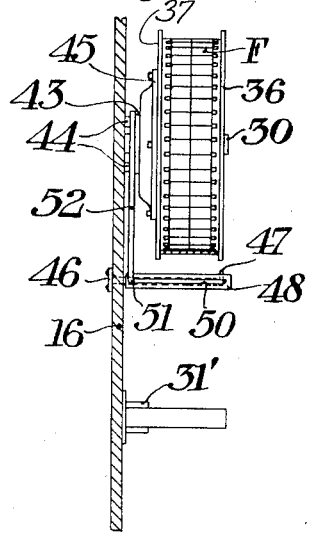
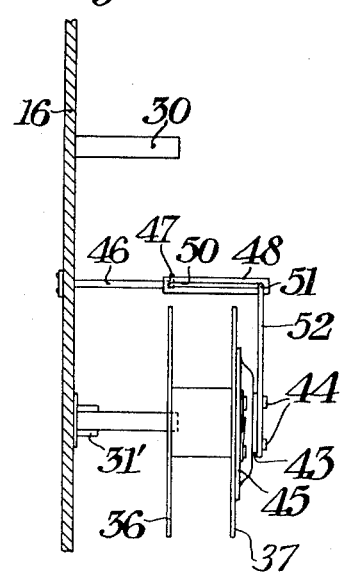
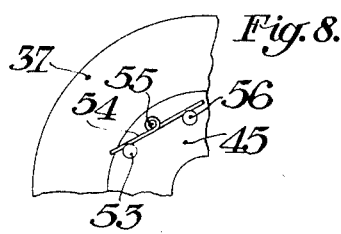
Emil L. Opperman, Inventor Patented Mar. 13, 1934

1,950,904

UNITED STATES PATENT OFFICE 1,950,904

GUIDE MEANS FOR A RECEPTACLE IN PHOTOGRAPHIC APPARATUS

Emil L. Opperman, Rochester, N. Y., assignor to Eastman Kodak Company, Rochester, N. Y., a corporation of New York Application December 11, 1931, Serial No. 580,336

12 Claims. (Cl. 242—55)

The present invention relates to a guide means for a film receptacle of a photographic apparatus, and more particularly to a means which permits the movement of the receptacle to a plurality of positions within the apparatus but which compels inversion of the receptacle during such movement.

The users of photographic apparatus adapted to receive film having laterally adjacent rows of successive picture areas are often greatly inconvenienced and annoyed by the common omission of failing to invert the film receptacle after the first run which results in passing the same row of successive images past the exposure aperture of the apparatus rather than the adjacent row of picture areas. In a camera such omission results in double exposure of one row and no exposure of the other row, with the consequent loss of the entire film because the double exposure is not discovered until after the film has been processed. In projection apparatus, the failure to invert the film receptacles is not as disastrous, but, nevertheless, greatly annoys the operator and spectators. It is, therefore, apparent that a form of guiding means for insuring the inversion of the film receptacle between runs is of great importance.

The primary object of the present invention is the provision of a guide means which is attached to the film receptacle and which compels inversion thereof upon movement from one position to another in the photographic apparatus.

Another object of the present invention is the provision of a swingable guide means which is permanently attached between the photographic apparatus and the film receptacle, the connection between the guide means and film receptacle being such that the receptacle may rotate in the usual manner.

A further object of the present invention is the provision of a guide means between a pair of spindles on a photographic apparatus, said guide means being so arranged and constructed that the film receptacle must be inverted upon movement from one spindle to the other.

Still another object of the present invention is the provision in a photographic apparatus of a swingable guide means which comprises a plurality of hinged links, one end link being fixed to the photographic apparatus and the other end link being rotatably connected to the film receptacle.

A still further object of the present invention is the provision in a photographic apparatus of an extensible and swingable guide means for compelling inversion of the film receptacle during movement from one of two positions to the other.

Another object of the present invention is the provision of a film receptacle in a photographic apparatus which is permanently attached thereto and which may be moved to at least two operative positions with respect to the photographic apparatus.

Other and further objects of the present invention will be suggested to those skilled in the art as the description of the invention with respect to the accompanying drawings is developed hereinafter.

The objects of the invention are attained by any swingable guide means between the photographic apparatus and the film receptacle which permits movement of the receptacle from one position to another in the apparatus but which compels the inversion thereof during such movement.

Preferably, these objects are attained by the provision of a hinged guide means including a plurality of hinged links with one end link attached to the photographic apparatus and the other end link rotatably and permanently connected to the film receptacle. An alternative form of the present invention comprises an extensible member which is located between the two positions or two spindles of the photogaphic apparatus and a yoke member which is swingably and slidably connected to the extensible member at one end and which is rotatably and detachably connected to the film receptacle at the other end.

Reference is hereby made to the accompanying drawings in which:

Fig. 1 is a side elevation of a motion picture camera, with the cover removed, illustrating the provision of the present invention in this type of photographic apparatus.

Fig. 2 is a horizontal transverse cross section on the line 2—2 of Fig. 1.

Fig. 3 is a vertical transverse cross section taken on the line 3—3 of Fig. 1.

Fig. 4 is a fragmentary view of the film receptacle showing the legends which will be visible when said film receptacle is on the supply spindle of a photographic apparatus.

Fig. 5 is a side elevation of a modified form of guide means showing the film receptacle in position upon the supply spindle.

Fig. 6 shows the modified form of guide means with the extensible member in extended position and with the film receptacle being positioned upon the take-up spindle.

Fig. 7 is a fragmentary perspective view of the extensible member and yoke member of the modified form of the invention.

Fig. 8 is a fragmentary plan view of the film reseptacle of Figs. 5 and 6, showing to enlarged scale the detachable mounting between the film receptacle and the yoke member.

Although the invention has been illustrated and will be described with respect to a motion picture camera, it is to be clearly understood that the invention is equally applicable to other types of photographic apparatus such as motion picture projectors.

The illustrated embodiments of the invention may both be applied to the form of motion picture camera here illustrated. The camera comprises the usual construction of a casing 10 provided with a rabbeted edge 11 to make a light-tight joint with a cover (not shown). An objective 12 is mounted in the front of casing 10. A vertical transverse partition 13 is located in the front of casing 10 and is provided with an aperture 14 registering with the aperture of the objective 12.

The gate employed in the particular camera illustrated is of rather unusual construction and will now be specifically described. The stationary member 15 of the gate is of the usual arcuate formation and is fastened to the mechanism plate 16 of the camera by means of bolts 17. The convex face of stationary member 15 is provided with an undercut portion 18 adjacent the mechanism plate 16. The movable gate member 19 has a protruding portion 20, which is adapted to fit into the undercut portion 18 of the stationary gate member 15, and has its inner edge slidably abutting the mechanism plate 16. A set of springs 21 are attached to partition 13 and have their free ends slidably abutting the convex surface of the movable gate member 19.

The film F passes around a feed sprocket 22, in the usual loop through the gate, and to the other side of feed sprocket 22. Studs 23 of known construction are rotatably mounted adjacent feed sprocket 22 to hold the film against said feed sprocket with the perforations of the film in engagement with the teeth of the feed sprocket. The film is advanced intermittently through the gate by any known form of intermittent film advancing mechanism.

The film advancing mechanism illustrated as an example comprises an arm 24 having a claw 25, one end of arm 24 being eccentrically mounted on a disk 26 while arm 24 is intermediately pivoted to a link 27 which is pivotally mounted upon the mechanism plate 16 by a pin 28. The disk 26 is driven by a crank or spring motor (not shown) to actuate claw 25 in a known path to intermittently move the film F downwardly between the stationary gate member 15 and the movable gate member 19. The movable gate member 19 is provided with an exposure aperture 29 which is adapted to expose only one side of the film and which is in registry with aperture 14 and objective 12.

It should be noted that the gate here disclosed may be easily and rapidly threaded with film. This is true because the shoulder formed on the stationary gate member 15 by the undercut portion 18 is lower than the shoulder formed on the movable gate member 19 by the protruding portion 20 so that the film contacting surface of gate members 15 and 19 are spaced with respect to each other even when there is no film in the gate. In other words, without any film in the gate, springs 21 will press movable gate member 19 toward stationary gate member 15 but the protruding portion 20 of movable gate member 19 will abut against the undercut portion 18 of stationary gate member 15 so that the film contacting portions of gate members 15 and 19 are held in spaced relation under such conditions.

Obviously, with the film contacting portions of the gate members already spaced, it is a very simple matter to insert the film into the gate throughout the entire length thereof.

The supply reel spindle 30 is round and is stationarily mounted in the mechanism plate 16. The take-up reel spindle 31 is also round and has a key 31' but is rotatably mounted in the mechanism plate 16. Spindle 31 projects through mechanism plate 16 and carries a pulley 32 which is actuated in a known manner by the camera mechanism (not shown). The mechanism plate 16, see Fig. 3, extends longitudinally through the camera to divide the camera casing 10 into a mechanism chamber 33 and a film reeling chamber 34.

The film receptacle is adapted to receive photographic strip material and is shown as a film reel 35 containing a coil of film F. The film reel 35 is provided with spindle openings of round formation provided with notches 35' adapted to engage key 31' when the reel is upon the take-up spindle 31. A second film reel 36 has side flanges 37 joined by a hub 38, flanges 37 being provided with round spindle openings having notches for receiving key 31'.

The foregoing elements and construction constitute no part of the present invention, since they are already well-known in the art. The real essence of the invention is the provision of a swingable guide means which will compel the inversion of the take-up film reel 36 during its movement or transfer from take-up reel spindle 31 after the first run of the film to the supply reel spindle 30 for the second run of the film.

According to the preferred form of the invention, see Figs. 1, 3, and 5, the guide means comprises a plurality of links 39 which are hinged together at their ends by means of pintles 40. One extreme link 39' is fastened to the camera casing 10 by rivets 41 while the other extreme link 39'' is rotatably and permanently connected to one flange 37 of film reel 36 in a manner to be later described. The mechanism plate 16 is provided with an aperture 42 so that the links 39 of the guide means may move freely between the mechanism chamber 33 and the film reeling chamber 34.

A collar 43 having a flange 43' is attached to link 39'' by means of a plurality of tongues 44. An annular ring 45 is permanently attached to one side flange 37 of film reel 36 by means of rivets 45' and is provided with a dished portion which receives the flange 43' of collar 43. This construction permits free revolution of the film reel 36 upon either of the spindles 30 or 31 but still provides a connection between the film reel 36 and the swingable guide means including the links 39 so that reel 36 cannot be moved from one spindle to the other without being inverted.

The permanent and rotatable connection of the film receptacle to the photographic apparatus by the guide means positively insures that the user will always have the necessary number of film reels for proper operation. Thus another source of annoyance sometimes caused by forgetfulness is overcome because it is not possible for the user to be without the two reels, one reel containing the film to be exposed or projected and the other reel permanently attached to the photographic apparatus.

A modification of the swingable guide means is illustrated in Figs. 5-7 inclusive. An upright bracket 46 is attached to the mechanism plate 16 and extends into the film reeling chamber 34 between the supply spindle 30 and take-up spindle 31. Lugs 47 are provided on bracket 46 and extend perpendicularly from the surface of the bracket. A slide 48 fits over upright bracket 46 and is provided with slots 49 which receive lugs 47 of bracket 46. Slide 48 is freely movable with respect to bracket 46 and constitutes the extensible member referred to in the claims, the lugs 47 and slots 49 cooperating to limit the movement of slide 48 with respect to bracket 46 of the camera casing 10. Depressions 50 are provided along the edges of slide 48 and receive the prongs 51 of a yoke member 52.

The yoke member 52 is rotatably and detachably connected to the film reel 36 by means of grooved or notched studs 53 on the flange 37 which extend through annular ring 45 on opposite sides thereof to be engaged by springs 54 on ring 45. Springs 54 encircle pins 55 on annular ring 45 and one set of spring ends abut studs 56 also on ring 45 while the other ends engage the grooves or notches in studs 53. It should be noted however that any form of detachable or permanent rotatable connection may be employed between the film reel 36 and the extreme link 39″ or yoke member 52.

The outer surface of one flange 37 on film reel 36 is provided with the legends such as "When empty leave on this shaft" and "When full place on other shaft", which legends are located upon film reel 36 so that they are visible to the user only when said film reel is located upon the take-up spindle 31.

The other side flange 37 of reel 36 is provided with other legends, see Fig. 4, such as "When empty place on other shaft" and "When full leave on this shaft". These latter legends are visible only when reel 36 is upon the supply reel spindle 30.

The operation of a photographic apparatus equipped with the guide means of the present invention will now be briefly described:

The supply film reel 35 is placed upon the supply reel spindle 30 and threaded through the photographic apparatus in the usual way to the take-up reel 36 mounted on the driven take-up reel spindle 31. After the first run of the film through the apparatus the supply reel 35 will be empty, the take-up reel will be full, and legends or other indicators placed upon the now-visible surface of the supply reel spindle 30 for the second run of the film. Either form of swingable guide means as here disclosed will permit this movement of the reel having film thereon to the other spindle and, at the same time, will compel the inversion of the reel containing film during this movement from spindle 31 to spindle 30.

The film is again threaded through the photographic apparatus and the second run takes place, whereupon the legends on the now empty reel upon the supply reel spindle 30 indicate that it should be moved to the take-up reel spindle 31, but, again, reel 36 must be inverted during such movement.

Since other modifications for accomplishing the same objects as the swingable guide means here disclosed may be readily conceived, the present disclosure is to be construed in an illustrative and not in a limiting sense.

It is to be understood that the swingable means is equally applicable to all types of photographic apparatus. It is to be understood that the swingable guide means may assume any formation which compels the inversion of the film receptacle or film reel upon movement from one reel spindle to the other. It is also to be understood that the swingable guide means must be so provided that the plurality of hinged links or the extensible member cannot be rotated in the plane of the mechanism plate but should only be swingable in a plane perpendicular to the rotational plane of the reels.

Having now particularly described my invention what I claim as new and desire to secure by Letters Patent of the United States is:

1. In a photographic apparatus the combination with a receptacle adapted to contain photographic strip material and to assume either of two positions in the same plane, of a swingable guide means connected to said receptacle and movable only in a plane perpendicular to the plane of receptacle positions for compelling inversion of said receptacle upon movement from one position to the other both within said plane of receptacle positions.

2. In a photographic apparatus the combination with a reel adapted to receive photographic strip material and a pair of spindles, one spindle being adapted to receive the reel in winding position and the other spindle being adapted to receive the reel in unwinding position, of a swingable guide means connected to said reel, movable only in a plane parallel to the axes of said spindles and permitting movement of said reel from one spindle to the other but compelling inversion thereof during such movement.

3. In a photographic apparatus the combination with a film reel and a pair of spindles adapted to receive such film reel, of a swingable guide member movable only in a plane parallel to the axes of said spindles and rotatably connected to said film reel, permitting movement of said film reel from one spindle to the other and locating said film reel in a single definite position on each spindle.

4. In a photographic apparatus the combination with a reel adapted to contain photographic strip material and a pair of spindles, one spindle being adapted to receive the reel in winding position and the other spindle being adapted to receive the reel in unwinding position, of a swingable guide means located between said spindles, movable only in a plane parallel to the axes of said spindles, and connected to said apparatus and said reel for compelling inversion thereof upon movement from one spindle or one position to the other spindle or position.

5. In a photographic apparatus the combination with a reel adapted to contain photographic strip material and to assume either of two positions in the same plane, of a slidable and swingable guide member, movable only in a plane perpendicular to the plane of reel positions, rotatably connected to said reel at one end and fixedly connected to the apparatus at the other end for compelling inversion of said reel upon movement from one position to the other.

6. In a photographic apparatus the combination with a reel adapted to contain photographic film and a pair of spindles in said apparatus adapted to receive said reel, of a hinged member including a plurality of the hinged links, one end link being fixed to said apparatus and the other end link being rotatably connected to said reel whereby said reel must be inverted during movement from one spindle to the other.

7. In a photographic apparatus the combination with a reel adapted to contain photographic film and a pair of spindles in said apparatus adapted to receive said reel, of a hinged member including a plurality of hinged links, one end link being fixed to said apparatus between said spindles and the other end link being rotatably connected to said reel whereby said reel must be inverted during movement from one spindle to the other.

8. In a photographic camera the combination with a camera casing, a mechanism plate therein, a pair of spindles extending from said mechanism plate and a film reel adapted to be placed upon either of said spindles, of a hinged member including a plurality of hinged links movable only in a plane perpendicular to said mechanism plate, one end link being fixed to said camera casing and the other end link being rotatably connected to said reel whereby the reel must be inverted upon movement from one spindle to the other.

9. In a photograhic camera the combination with a camera casing, a mechanism plate therein to form a reeling chamber and a mechanism chamber, a pair of spindles extending from said mechanism plate into the reeling chamber, and a film reel adapted to be placed upon either of said spindles, of a hinged member including a plurality of hinged links having one end link fixed to said camera casing within the mechanism chamber and having the other end link rotatably connected to said film reel, said mechanism plate being apertured to permit movement of said hinged links between said mechanism and reeling chambers.

10. In a photographic apparatus the combination with a reel adapted to contain photographic film and to assume either of two positions in the same plane with respect to said apparatus, of an extensible and swingable guide means movable only in a plane perpendicular to the plane of reel positions and connected to said reel for compelling inversion of the same upon movement from one position to the other.

11. In a photographic apparatus the combination with a reel adapted to contain photographic film and to assume either of two positions with respect to said apparatus, of an extensible member mounted on said apparatus and a yoke member at one end slidably and swingably connected to said extensible member and at the other end rotatably connected to said reel.

12. In a photographic apparatus the combination with a reel adapted to contain photographic film and a pair of spindles on said apparatus, one spindle being adapted to receive said reel in winding position and the other spindle being adapted to receive the reel in unwinding position, of an extensible member mounted on said apparatus between said spindles and a yoke member at one end slidably and swingably connected to said extensible member and at the other end rotatably connected to said reel whereby said reel may be moved from one spindle to the other but must be inverted during such movement.

EMIL L. OPPERMAN.